No. 748,717. PATENTED JAN. 5, 1904.
H. FUNK.
GRAIN DRILL.
APPLICATION FILED OCT. 31, 1903.
NO MODEL.
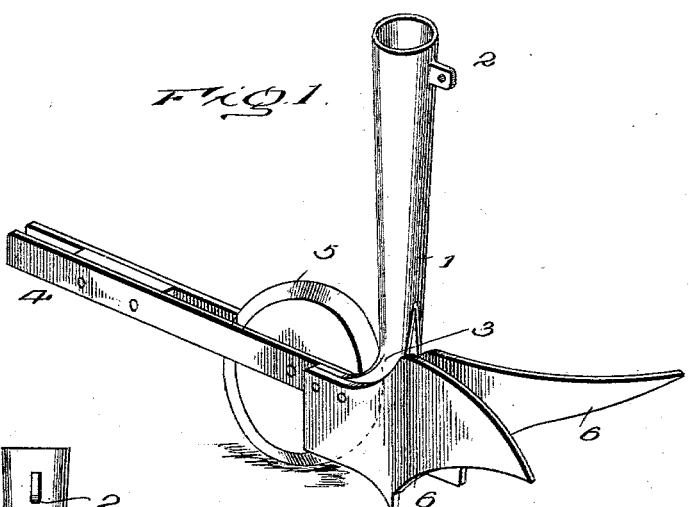
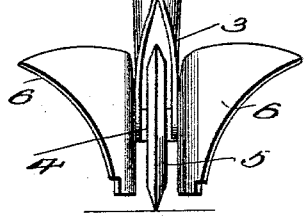
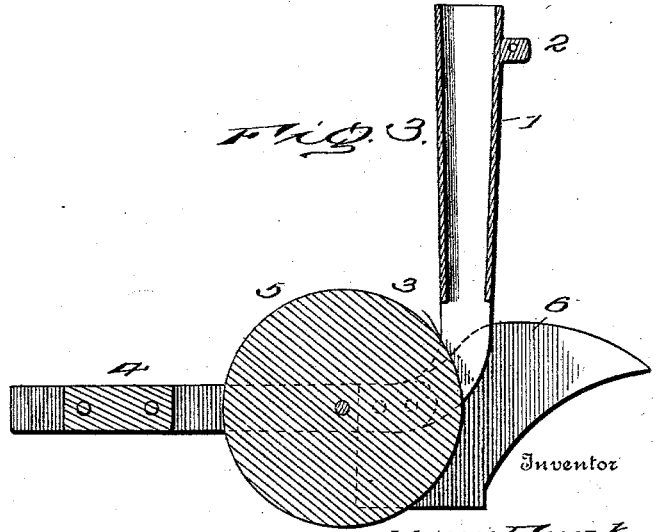
Inventor
Henry Funk.
Witnesses
John Wheeler
By
R. S. & A. B. Lacey
his Attorneys No. 748,717.

Patented January 5, 1904.

UNITED STATES PATENT OFFICE.

HENRY FUNK, OF PANA, ILLINOIS.

GRAIN-DRILL.

SPECIFICATION forming part of Letters Patent No. 748,717, dated January 5, 1904.

Application filed October 31, 1903. Serial No. 179,349. (No model.)

*To all whom it may concern:*

Be it known that I, HENRY FUNK, a citizen of the United States, residing at Pana, in the county of Christian and State of Illinois, have invented certain new and useful Improvements in Grain-Drills, of which the following is a specification.

This invention is designed to provide a novel form of drill for sowing wheat and grain in deep furrows and ridging the same, thereby preventing the same being affected by drought and cold.

The drill comprises a rotary furrow-opener, a boot straddling the furrow-opener at its lower end, and wings at each side of the disk colter and boot for ridging the soil, so as to secure the best results.

The invention consists, essentially, of the novel features, structural details, and combinations of parts, which hereinafter will be more particularly set forth, claimed, and illustrated in the drawings hereto attached, in which—

Figure 1 is a perspective view of a grain-drill embodying the invention. Fig. 2 is a rear view thereof. Fig. 3 is a vertical sectional view.

Corresponding and like parts are referred to in the following description and indicated in all the views of the drawings by the same reference characters.

The boot 1 may be of any structural type commonly employed in grain-drills and is provided near its upper end with the lug 2 for receiving the suspending means, (not shown,) the lower end of the boot being forwardly curved and cleft or bifurcated, as shown at 3.

The drag-bar 4 comprises companion members which are arranged upon opposite sides of the rotary colter or disk cutter 5 and are secured at their rear ends to the fork members or bifurcations 3 of the boot. The rotary colter or disk cutter 5 may be of any form commonly employed in agricultural implements and is journaled between the companion members of the drag-bar 4, its rear portion operating in the cleft formed between the fork members 3 of the boot.

The wings 6 are secured to the fork members 3 of the boot and flare laterally, upwardly, and rearwardly toward their rear ends after the fashion of the ordinary moldboard or sweep used in connection with a plow or cultivator point. The front edges of the wings come close against or touch opposite sides of the rotary colter, so as to obviate the formation of shoulders, which would materially interfere with the operation of the drill and increase the draft. The lower edges of the wings are about in the same horizontal plane and terminate a short distance above the cutting edge of the rotary colter, thereby permitting the latter to penetrate the soil to a distance below the plane of the lower edges of the wings.

In the operation of the invention the drill is attached to the implement in the usual manner through the instrumentality of the lug 2 and drag-bar 4. As the drill is drawn over the field the soil is opened by the colter 5 and the grain is deposited in the furrow immediately in the rear of the colter and between the wings, the latter preventing the soil closing in over the grain until the same reaches the bottom of the furrow. The parts are so proportioned and arranged that after the grain has entered the furrow and reached the bottom thereof the earth closes over the same, the lower rear edges of the wings being cut away to admit of this operation.

Having thus described the invention, what is claimed as new is—

1. In a grain-drill, the combination of a boot having its lower end bifurcated, a drag-bar having portions attached to the bifurcations of the boot, and a rotary colter journaled in the space formed between the separated portions of the drag-bar and operating in the space formed in the bifurcations of said boot, substantially as set forth.

2. In a grain-drill, the combination of a boot having its lower end bifurcated, a drag-bar having portions attached to the bifurcations of the boot, a rotary colter journaled in the space formed between the separated portions of the drag-bar and operating in the space formed in the bifurcations of said boot, and wings connected to the bifurcations of the boot and curved laterally, rearwardly and upwardly toward their rear ends, substantially as set forth.

3. A grain-drill comprising a boot having its lower end forwardly curved and bifurcated, a drag-bar comprising companion members having their rear ends attached to the bifurcations of the boot, a rotary colter journaled to the drag-bar and operating in the space formed between the bifurcations of the boot, and wings attached to the bifurcations of the boot and having their front ends conforming to opposite sides of the colter and their lower edges straight and in a plane above the lowest cutting-point of the colter, substantially as specified.

In testimony whereof I affix my signature in presence of two witnesses.

HENRY FUNK. [L. S.]

Witnesses:
B. V. HOWARD,
EDGAR ELLIOTT.